US012453981B2

(12) United States Patent
Kakar et al.

(10) Patent No.: US 12,453,981 B2
(45) **Date of Patent: *Oct. 28, 2025**

(54) METHOD OF COATING ALLOY WHEELS

(71) Applicant: Superior Industries International, Inc., Southfield, MI (US)

(72) Inventors: Parveen Kakar, Novi, MI (US); Henry Clay Chenault, Fayetteville, AR (US)

(73) Assignee: Superior Industries International, Inc., Southfield, MI (US)

( * ) Notice: Subject to any disclaimer, the term of this patent is extended or adjusted under 35 U.S.C. 154(b) by 870 days.

This patent is subject to a terminal disclaimer.

(21) Appl. No.: 15/524,075

(22) PCT Filed: Nov. 10, 2015

(86) PCT No.: PCT/US2015/059954
§ 371 (c)(1),
(2) Date: May 3, 2017

(87) PCT Pub. No.: WO2016/077345
PCT Pub. Date: May 19, 2016

(65) Prior Publication Data

US 2017/0320080 A1 Nov. 9, 2017

Related U.S. Application Data

(60) Provisional application No. 62/077,447, filed on Nov. 10, 2014.

(51) Int. Cl.
*B05B 7/20* (2006.01)
*B05B 7/00* (2006.01)
(Continued)

(52) U.S. Cl.
CPC ................ *B05B 7/201* (2013.01); *B05B 7/00* (2013.01); *B05B 7/0075* (2013.01); *B60B 3/02* (2013.01);
(Continued)

(58) Field of Classification Search
CPC ......... B05B 7/201; B05B 7/0075; B05B 7/00; B05B 13/0431; B05B 7/22;
(Continued)

(56) References Cited

U.S. PATENT DOCUMENTS 4,866,241 A 9/1989 Doherty et al.
5,569,496 A * 10/1996 Wei .......................... B60B 3/02 427/450
(Continued)

FOREIGN PATENT DOCUMENTS

CN 101076416 A 11/2007
DE 102009042103 A1 3/2011
(Continued)

OTHER PUBLICATIONS

Chinese Notification of First Office Action & Search Report of Chinese Application No. 201580067198.8 dated Feb. 19, 2019.
(Continued)

*Primary Examiner* — Adil A. Siddiqui
(74) *Attorney, Agent, or Firm* — Bodman, PLC

(57) ABSTRACT

An alloy wheel is formed having a three dimensional configuration defining a face and recessed surfaces. The face of the wheel is machined providing a smooth surface at the face and defining an edge between the smooth surface of the face and the recessed surfaces. A nozzle element for projecting a plasma jet toward the wheel is provided. The plasma jet is projected toward the smooth surface of the face, the edge, and toward at least a portion of the recessed surfaces forming an alloy oxide at least on the face and the edge disposed between the face and the recessed surfaces. A first polymeric coating is applied over the face, the recessed surfaces and the edge disposed between the face and the recessed surfaces.

8 Claims, 4 Drawing Sheets

(51) Int. Cl.

| | |
|---|---|
| ***B05D 5/06*** | (2006.01) |
| ***B60B 3/02*** | (2006.01) |
| ***C08G 77/04*** | (2006.01) |
| ***C23C 28/00*** | (2006.01) |

(52) U.S. Cl.
CPC .............. *C08G 77/04* (2013.01); *C23C 28/00* (2013.01); *B05D 5/068* (2013.01)

(58) Field of Classification Search
CPC ... B05B 13/0442; B60B 3/02; B60B 2310/60; C08G 77/04; C23C 28/00; C23C 18/06; C23C 18/1216; C23C 18/125; C23C 18/1295
See application file for complete search history.

(56) References Cited

U.S. PATENT DOCUMENTS

| | | | | |
|---|---|---|---|---|
| 6,677,550 | B2 * | 1/2004 | Fornsel | H05H 1/34 219/121.5 |
| 2005/0120557 | A1 * | 6/2005 | Gatton | B23B 5/02 29/894.32 |
| 2005/0282003 | A1 | 12/2005 | Mayzel et al. | |
| 2006/0000094 | A1 | 1/2006 | Garesche et al. | |
| 2007/0207310 | A1 | 9/2007 | Storey | |
| 2008/0057212 | A1 * | 3/2008 | Dorier | C23C 4/134 427/446 |
| 2010/0209618 | A1 | 8/2010 | Kuhlenschmidt et al. | |
| 2012/0015209 | A1 * | 1/2012 | Straccia | C23C 28/00 428/632 |

FOREIGN PATENT DOCUMENTS

| | | | |
|---|---|---|---|
| WO | 2004076716 | A1 | 9/2004 |
| WO | 2014118211 | A1 | 8/2014 |

OTHER PUBLICATIONS

Mannouch, Steve, "Spray Gun Technique." ITW DeVilbiss Ind. Training Center (Oct. 1995), Issue 2.
"How to Powder Coat." http://web.archive.org/web/20130830034400/http://www.wikihow.com/Powder-Coat.
International Search Report and Written Opinion of International Application No. PCT/US2015/059954 dated Mar. 3, 2016.
Chinese Notification of Second Office Action & Search Report of Chinese Application No. 201580067198.8 dated Oct. 28, 2019.

* cited by examiner

METHOD OF COATING ALLOY WHEELS

PRIOR APPLICATIONS

This application is the National Stage of International Patent Application No. PCT/US2015/059954, filed on Nov. 10, 2015, which claims priority to U.S. Provisional Patent Application No. 62/077,447 filed Nov. 10, 2014.

TECHNICAL FIELD

The present application relates generally toward a method of coating a cast alloy wheel for providing improved durability. More specifically, the present application relates toward a method of treating a cast alloy wheel with plasma as part of a coating process for providing improved durability.

BACKGROUND

Improving durability of exterior automotive components is an ongoing endeavor. In particular, chipping or other abrasion of an exterior coating of a metallic substrate is known to cause accelerated failure of the coating from oxidation, which is manifested as white rust on aluminum alloy components. This is particularly true for aluminum wheels, which require a significant amount of processing to provide an aesthetically pleasing surface that is also resistant to chipping and rust. To date, none of the treatments performed on cast alloy wheels has been able to provide the enhanced durability requested by the OEM customer.

The three-dimensional configuration of a typical cast alloy wheel adds to the complexity of the coating process. The present process includes a number of steps beginning with forming the alloy wheel though a cast process to achieve the three-dimensional configuration. Subsequent to forming, the alloy wheel is machined to provide a smooth surface having a desired configuration. After machining, the entire wheel is subject to a pre-treatment including liquid cleaning and the addition of a conversion coating to provide corrosion resistance and improved paint adhesion. The conversion coating is known to include an acidic wash to prepare the surface of the alloy to receive a paint coating. Subsequent to treatment with the conversion coating, the wheel is painted with a powder primer and liquid color coat after which, the face of the wheel is sometimes again machined to expose a bright machined surface to achieve a desired aesthetic affect. The machined portion of the wheel is once again treated with a conversion coating and painted with a powder or liquid clear coat to provide a two-toned appearance where the face of the wheel exhibits a bright machined surface and the remainder of the three-dimensional contours of the wheel exhibits the color coating.

This process is not only exceedingly laborious, the durability of the clear coat coating, particularly on the face of the wheel, has not kept pace with increasing consumer expectations. The cost associated with maintaining and operating application equipment for applying the conversion coating is becoming increasing cost prohibitive while not providing requisite durability. Therefore, it would be desirable to enhance the durability of the coated surfaces of an alloy wheel while simultaneously reducing the number of steps required to provide a durable coating.

SUMMARY

A method of coating an alloy wheel to provide enhanced durability is disclosed. An alloy wheel is formed having a three dimensional configuration defining a face and recessed surfaces. The face of the wheel is machined providing a smooth surface at the face and defining an edge between the smooth surface of the face and the recessed surfaces. A nozzle element for projecting a plasma jet toward the wheel is provided. The plasma jet is projected toward the smooth surface of the face, toward the edge, and toward at least a portion of the recessed surfaces forming an alloy oxide at least the on the face and the edge disposed between the face and the recessed surfaces. A first polymeric coating is applied over the face, the recessed surfaces and the edge disposed between the face and the recessed surfaces.

In addition to projecting a plasma jet toward the wheel surface, a plasma jet is optionally projected onto a first paint coating prior to applying a second paint coating. Subjecting the first paint coating to the plasma treatment has proven to enhance adhesion between coating layers. When used in combination with projecting the plasma jet onto the wheel alloy, multi-layer coating adhesion and durability improvements are achievable.

The inventive method of the present application has provided enhanced durability qualities that weren't previously achievable of the prior art coating process. Prior to the performance testing done on a wheel subjected to the process of the present application, it was believed that treating an alloy surface with a conventional conversion coating provided the best possible durability when the wheel surface is painted with a polymeric coating. The improvements after accelerated testing exceeded all expectations by providing unexpected durability results. After filiform testing in a humidity chamber nearly no corrosion extended from a line scribed into the alloy substrate as per ASTM test procedures. Alternatively, a conventional wheel coating system making use of a conventional conversion coating showed in excess of 3 mm of corrosion.

A gravelometer test was performed per ASTM D3170 standards on a wheel coated by the method of the present invention and a wheel coated by the conventional method. Although the coating was marred, the wheel coated using the method of the present invention showed no chipping of the coating layers after being subjected to the gravelometer test and having an ASTM rating of A, or the highest rating. The wheel having the conventional coating showed a significant number of coating chips in the range of 3-6 mm.

BRIEF DESCRIPTION OF THE DRAWINGS

Other advantages of the present invention will be readily appreciated, as the same becomes better understood by reference to the following detailed description when considered in connection with the accompanying drawings, wherein.

DETAILED DESCRIPTION

Figure 1:
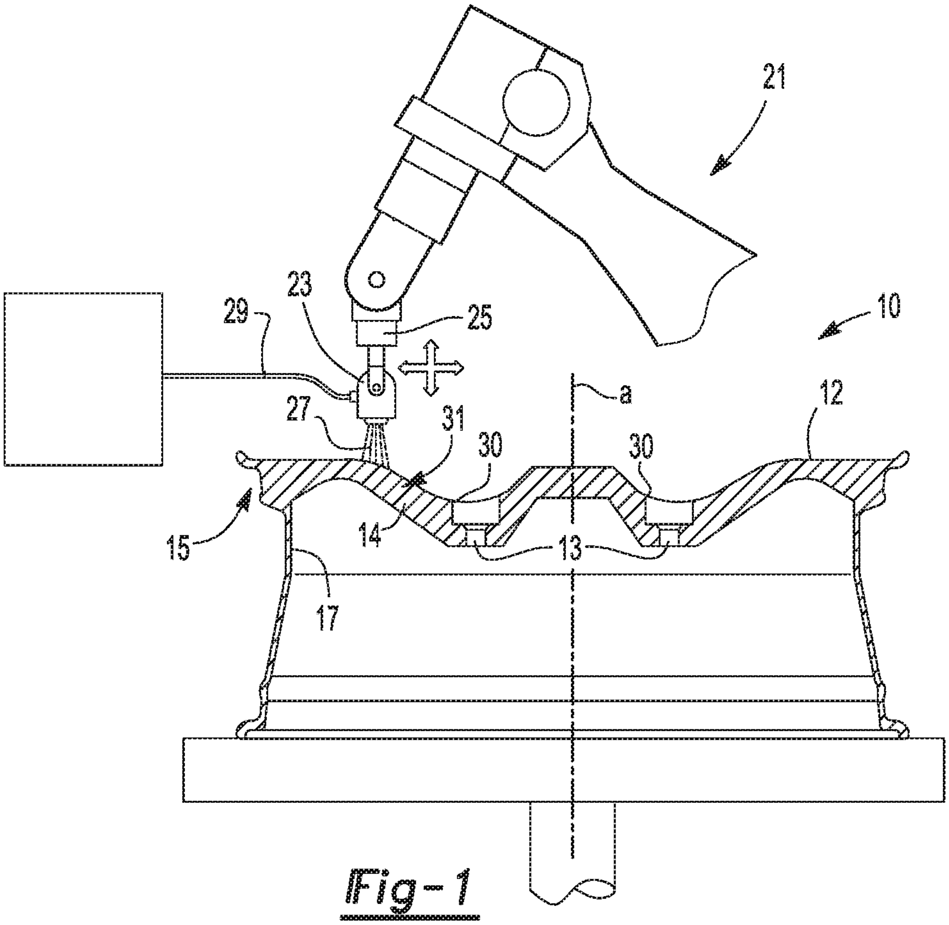
FIG. 1 shows a cross-sectional view of a wheel and nozzle element of the present invention.

The method of coating an aluminum wheel of the present invention provides a streamlined process over that of the prior art while simultaneously enhancing durability of the wheel. Referring now to FIG. 1, a cross-section of an aluminum wheel is generally shown at 10. The wheel 10 is formed via a conventional forming method and includes a machined face 12 of the wheel to form a “bright machined” surface. Additional machine operations to form lug apertures 13 and a valve stem aperture 15 are included, but are not within the scope of this invention. The wheel 10 defines a wheel axis a around which the wheel rotates as is well known to those of skill in the art. The wheel 10 also includes three-dimensional configuration having recessed surfaces 14 that define side of the wheel spokes and visible portions of a wheel rim 17. An edge 19 is disposed between the machined face 12 and the recessed surfaces 14.

A nozzle element 21 includes plasma nozzle 23 that is mounted on an articulating arm 25, such as, for example, a robot arm. The plasma nozzle 23 projects a plasma jet 27 in an atmospheric environment as set forth in U.S. Pat. No. 6,677,550, the contents of which are included herein by reference. The nozzle 23 is provided by PlasmaTreat GmbH. However, the other equivalent nozzles 23 capable of providing an atmospheric plasma jet may also be used. A gas line 29 feeds a reactant gas into the nozzle 23 when desired. It is contemplated by the inventors that siloxane, or other reactant will suffice as will become more evident herein below.

The articulating arm 25 moves the nozzle 23 laterally in a generally parallel direction relative to the wheel axis a and radially inwardly and outwardly relative to the wheel 10. During processing, the wheel 10 rotates around axis a while the nozzle 21 projects the plasma jet 27 toward the wheel 10. While the wheel rotates, the articulating arm moves the nozzle 21 in a radial direction so that the plasma jet 27 contacts the entire face 12 and edge 19 of the wheel. The nozzle 23 continues to project the plasma jet 27 into open spaces 31 between spokes 33 and lug apertures 13 of the wheel 10 so that at least a portion of the recessed surfaces 14 are subject to plasma treatment.

Figure 2:
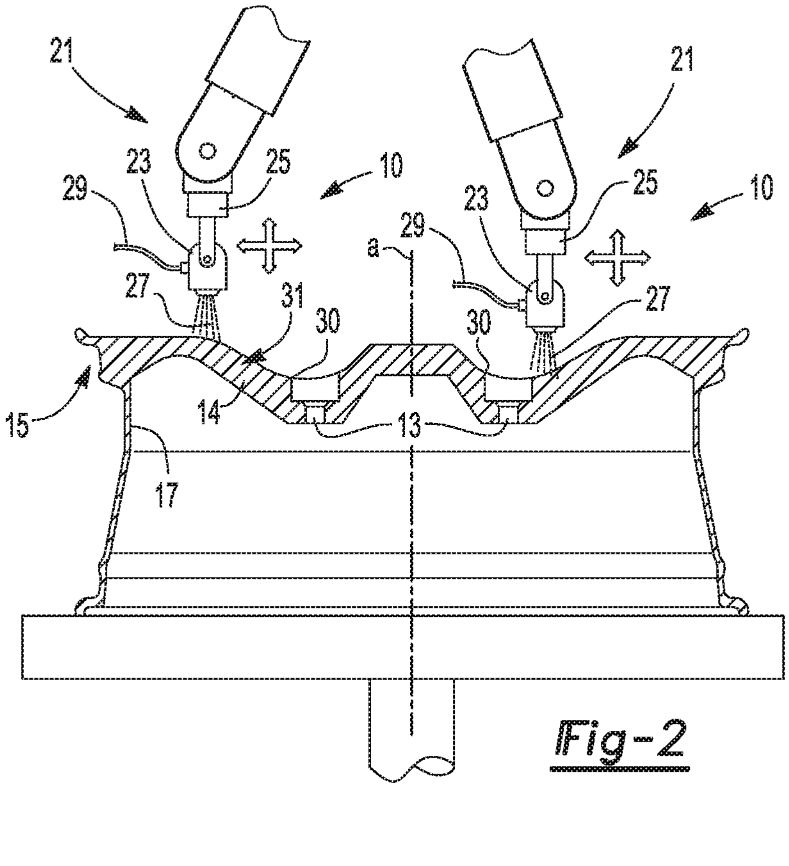
FIG. 2 shows a cross-sectional view of a wheel and an alternative embodiment of the nozzle element of the present invention.

An alternative embodiment is shown in FIG. 2 where two nozzle elements 21 are included. Each nozzle element 21 includes a nozzle 23 mounted on an articulating arm 25. The two nozzle elements 21 are believed to reduce the cycle time for plasma treatment in half. Each nozzle 21 moves in a lateral direction parallel to the axis a and in a radial direction related to the wheel. In one example, the wheel moves only 180° while the nozzles project plasma jet 27 at a desired location. It is further contemplated that the wheel can remain in a stationary position while each articulating arm 25 moves each nozzle 23 around the wheel 10, including projecting plasma directly at the recessed surfaces 14. It is further believed that more than two nozzle elements 21 can be selected to further reduce cycle time.

In the alternative embodiment, multiple nozzles extend radially outwardly from the axis a so that the wheel need only turn one rotation of 360° to complete the plasma process. A still further embodiment, a plurality of nozzles 29 are configured as an X or a cross shape extending radially outwardly from the axis a so that the wheel need only turn 90° for full plasma coverage or not at all while the articulating arms 25 move the nozzles 29 around the wheel 10.

Figure 3:
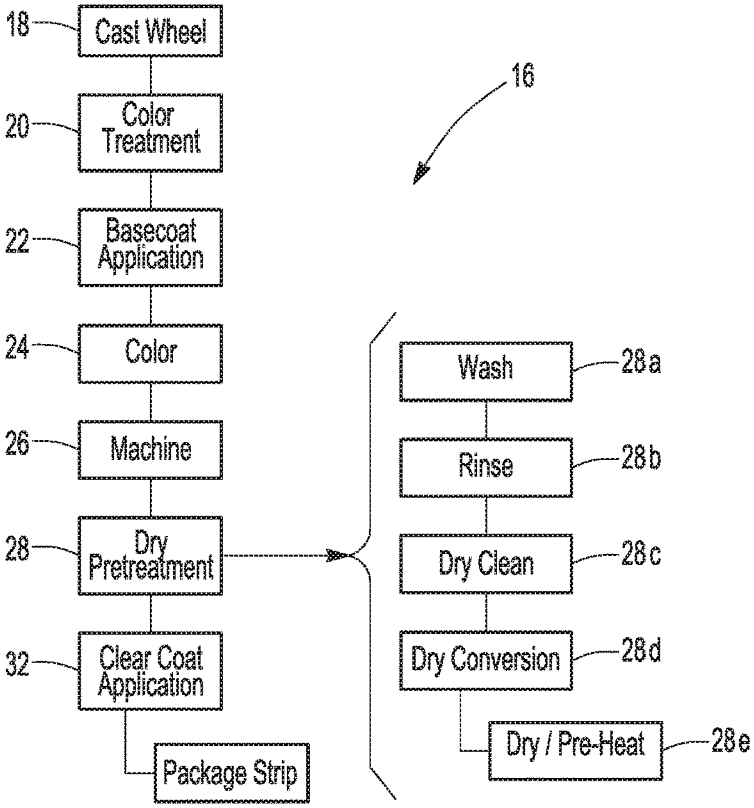
FIG. 3 shows flow chart of one embodiment of the method of the present invention.

Referring now to FIG. 3, a flowchart of a first embodiment is generally shown at 16 where each numbered box represents a different Step of the processing and coating of the wheel 10. The wheel 10 is first formed to a geometrically desirable configuration as identified at Step 18. Subsequent to the forming Step 18, the wheel 10 is subject to conventional cleaning and pretreatment as identified at Step 20 where acidic cleaners, such as, for example, a phosphoric based cleaner, clean the surface of the wheel and a zirconium titanium molecular etch is performed to form a zirconium based conversion coating to prepare the entire surface of the wheel for applying a paint coating. Subsequent to the pretreatment Step 20, a base coat is applied to the entire wheel surface providing a primer surface as identified at Step 22. Subsequent to applying the base coat at Step 22, a color coating is applied to, at least, the three-dimensional surface 14 of the wheel 10 as identified at Step 24. The color coating at Step 24, sometimes referred to as a base coat, includes pigments for color and metallic flakes to add visual depth to the three-dimensional surface 14 to further enhance the esthetics of the wheel 10. Subsequent to the color coating Step 24, the face 12 of the wheel 10 is machined on a lathe to provide a generally planar surface that has a bright machined appearance as identified at Step 26. It should be understood by those of ordinary skill in the art that after each paint application step 20, 24, 32 the paint is cured in a paint bake oven.

After the machining 26 Step is performed on the face 12 of the wheel 10, which is now a bare, smooth machined aluminum, the face 12 subject to a dry pretreatment as identified at Step 28. The dry pretreatment Step 28 includes washing 28A and rinsing 28B the wheel 10 to provide a clean surface to the face 12 by removing alloy grinds, dust and die release agents. Subsequent to rinsing, the face 12 of the wheel is subject to a plasma treatment having an atmospheric plasma jet 27 for providing dry cleaning to the face 12 of the wheel 10. This is best represented in FIG. 1 where a plasma nozzle 23 is shown providing a plasma jet 27 onto the bright machined surface comprising the face 12 of the wheel 10.

In this embodiment, the wheel 10 is pivoted on an axis a (FIG. 3) while the nozzle 29 moves toward the axis a (FIGS. 1 and 2) of the wheel 10 from proximate the rim 17 toward the axis a for providing a plasma treatment 28C (FIG. 4) to the bright machined face 12 of the wheel 10 and to edges 30 disposed between the three-dimensional surface 14 and the face 12 of the wheel 10. In this embodiment, the plasma jet 27 used in Step 28C includes a spray pattern providing a rapid dry cleaning to the bright machined face 12 of the wheel 10.

Figure 4:
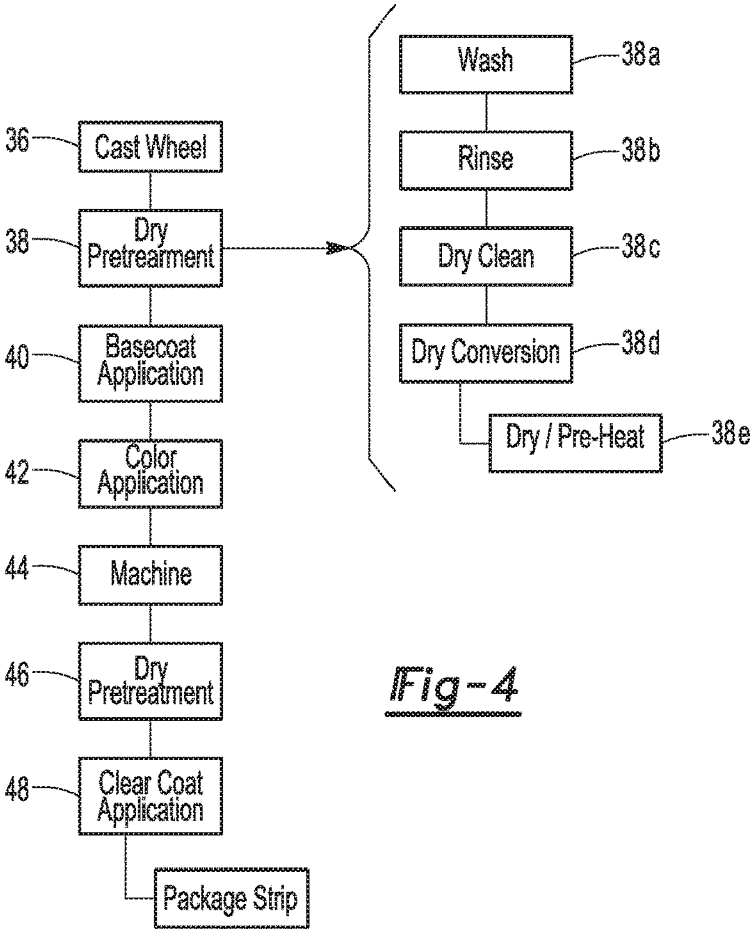
FIG. 4 shows a flow chart of a further embodiment of the method of the present invention.

At Step 28D of FIG. 4, a dry conversion process is performed where a siloxane or equivalent reactant is injected into the plasma jet 31 to which an aluminum siloxane molecular structure or other alloy siloxane structure, is formed onto the bright machined face 12 of the wheel 10. In this embodiment, it is contemplated by the inventors that the plasma jet 31 diameter is about 6 mm. However, the plurality embodiments of nozzle 23 configuration for the dry or plasma of Step 28B set forth above may also be used. Furthermore, it is desirable to space the nozzle 23 for both Steps 28C and 28D at an effective distance from the bright machined face 12 of the wheel 10. To the extent the bright machined face 12 of the wheel 10 is not substantially planar, the nozzle 23 moves toward the face 12 of the wheel 10 to maintain the effective distance from the face 12, as set forth above. As further set forth above, the edge 19 is also subject to the plasma jet 27. A surface energy of the face, the recessed surfaces and the edge disposed between the face and the recessed surfaces is raised from a first surface energy to a second surface energy where the second surface energy is greater than the first surface energy when subject to the plasma jet 27.

Subsequent to the dry conversion Step 28D, a dry preheat Step 28E is performed to prepare the wheel for a clear coat paint application identified at Step 32. The clear coat is either a powder or liquid depending upon the needs and performance requirements of a particular wheel. After the clear coat has cured, the wheel is ready for packaging and shipping as shown in Step 34.

An alternate embodiment is shown in FIG. 4. In this embodiment the wheel is formed at Step 36 as set forth above. Subsequent to forming, the entire wheel is subject to a color pretreatment identified at Step 38. During the color pretreatment Step 38, the entire wheel is washed and rinsed as identified in Steps 38A and 38B to clean contaminants from casting off the surface of the wheel 10. The entire wheel 10 is treated to an atmospheric plasma cleaning as identified as Step 38C. In this embodiment, the wheel is placed into a vacuum chamber where a plasma gas performs plasma cleaning on the entire surface of the wheel 10. Subsequent to the plasma cleaning Step 38C, a plasma or dry conversion Step 38D is performed. In this Step 38D, the chamber is again maintained in a vacuum and a siloxane gas, or equivalent reactant, is injected prior to plasma treating the entire wheel. Therefore, the entire wheel includes a siloxane aluminum, or equivalent siloxane alloy, etched surface. Subsequent to the plasma conversion Step 38D, the wheel 10 is subject to a dry preheat Step 38E completing the dry pretreatment Step 38 of the wheel 10. A base coat or primer application follows the dry pretreatment Step 38 as is identified at Step 40. Subsequent to the base coat application Step 40, a color application Step 42 is performed in a similar manner as set forth above.

The face 12 of the wheel 10 is subject to a machining Step 44 that occurs in a similar manner as set forth above to expose a bright machined face 12. After the machining Step 44, a dry pretreatment Step 46 occurs, which is similar to the clear pretreatment Step set forth at Step 28 in the embodiment set forth above. Therefore, the bright machined face 12 of the wheel 10 in this embodiment receives an atmospheric plasma cleaning and plasma conversion by way of plasma jet 27 prior to being subject to a clear coat application Step 48. As set forth above, the clear coat application takes the form of a powder clear coat or a liquid clear coat. As further set forth above, after each paint application step 40, 42, 48 the paint is cured in a paint bake oven. Once the clear coat is cured, the wheel is packaged for shipping to the customer.

Figure 5:
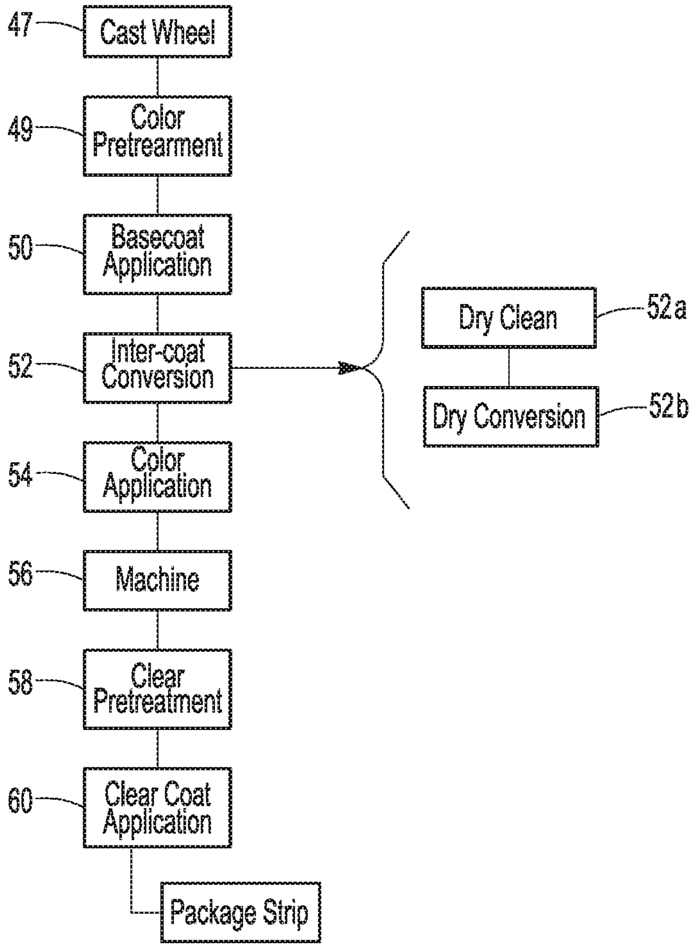
FIG. 5 shows a flow chart of a still further embodiment of the method of the present invention.

A still further embodiment is shown in FIG. 5. In this embodiment, the first Step is a forming Step 47 after which the wheel 10 is subject to a color pretreatment Step 49. The color pretreatment Step 49 is either a conventional color pretreatment where the wheel is subject to a liquid cleaning and a liquid conversion, or a dry clean and dry conversion as desired. Subsequent to the color pretreatment Step 49, the wheel is subject to a base coat application Step 50 includes providing a primer, in particular, to the three-dimensional surfaces 14 of the wheel 10. After the base coat application Step 50, an inter-coat conversion Step 52 is performed subjecting the base coat disposed on the wheel 10 to a dry, plasma cleaning 52A as set forth above, followed by a dry conversion Step 52A of plasma having a siloxane or other reactant disposed in the plasma jet to alter the chemical composition of the base coat applied during the base coat application Step 50.

Subsequent to the inter-coat conversion Step 52, the wheel receives a color coating, in particular on the three-dimensional surfaces 14 via the color application Step 54. The face 12 of the wheel 10 is next subject to a machining Step 56 to provide a bright machined surface that is next subject to a clear pretreatment Step 58 being either a conventional liquid pretreatment or the plasma cleaning and plasma conversion treatment using the plasma jet 27 set forth above. When a clear pretreatment Step 58 is completed a clear coat application Step 60 provides an aesthetically pleasing finish to the entire wheel 10. As set forth above, after each paint Step 50, 54, 60 the paint is cured in a paint bake oven. Once complete, the wheel 10 is packaged for shipment to the customer.

Figure 6:
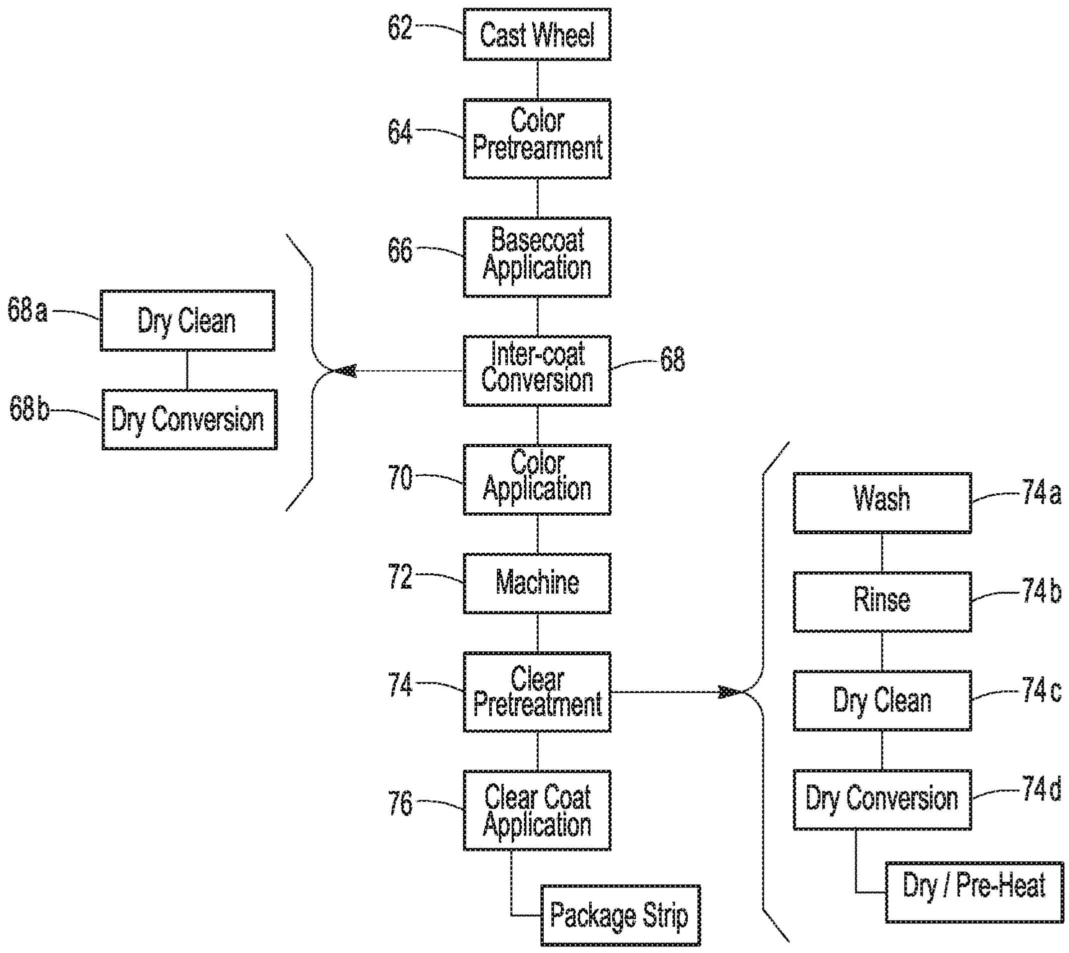
FIG. 6 shows a flow chart of a still further embodiment of the method of the present invention.

Referring now to FIG. 6, the flexibility of the subject invention is shown where alternative and redundant dry treatment steps may be applied to the wheel 10 making use of the plasma clean and plasma conversion steps of the present invention. In this manner, the wheel is formed Step 62, and is subsequently subject to the color pretreatment Step 64 which makes use of a liquid cleaning and a liquid conversion coating. Next, the base coat application Step 66, a primer is applied to the wheel 10.

Following the base coat application Step 66, the wheel is subject to an inter-coat conversion Step 68 that is performed in the same manner as set forth at the embodiment above making use of plasma cleaning 68A and plasma conversion Step 68B of the primer applied at the base coat application Step 66. Subsequent to the inter-coat conversion Step 68, the wheel 10 is subject to a color application Step 70, whereby a color coating is applied, at least to the three-dimensional surfaces 14 of the wheel 10.

Following the color application Step 70, the face 12 of the wheel 10 is machined on a lathe during the machining Step 72 to provide a bright machined surface on the face 12 of the wheel 10. Following the machining Step 72, the clear pretreatment Step 74 occurs where the wheel 10 is first washed at the washing Step 74A and rinsed at the rinsing Step 74B. Following the rinsing Step 74B, the dry clean Step 74C and the dry conversion Step 74D making use of ambient plasma jet 27 including siloxane, or equivalent reactant, respectively, as set forth above, occurs. Subsequent to the dry conversion Step 74D, the wheel is dried and preheated after which the clear coat application Step 76 occurs to apply clear coat to the entire wheel. As set forth above, after each paint Step 66, 70, 76, the paint is cured in a paint bake oven. After the clear coat Step 76 has been completed, the wheel 10 is packaged and shipped to the customer.

It should be understood by those of ordinary skill in the art, that each plasma Step not only provides a dry cleaning, to at least the bright machined surface 12 of the wheel 10, and a dry conversion using a siloxane or similar reactive compound is also subjects the transition edge 19 to the same pretreatment. In each embodiment, the durability performance of the wheel when subject to chip testing and corrosion testing showed unexpected and enhanced results. Various application methods of the dry cleaning and dry conversion Steps contemplated by the inventors include a 2D turning profile where the wheel 10 is pivoted on its axis a along a three-dimensional CNC surface profile whereby the plasma jet 27 follows the profile of the wheel by way of articulating arm 25, and plasma treatment of the entire wheel in a low vacuum environment at both ambient and siloxane enhanced Steps.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, the invention may be practiced otherwise than is specifically described.

What is claimed is:

1. A method of coating an alloy wheel, comprising the steps of:

forming a wheel including an alloy substrate having a three dimensional configuration defining a face and recessed surfaces;

applying a base polymer coating over said alloy substrate;

machining said face of said alloy substrate thereby removing said base polymer coating and re-exposing the alloy substrate for providing a smooth surface at said face and defining an edge between said smooth surface of said face and said recessed surfaces with said recessed surfaces retaining said base polymer coating;

providing a nozzle element for projecting an atmospheric plasma jet toward said wheel;

after machining said face of said wheel, projecting the atmospheric plasma jet from said nozzle element toward said smooth surface of said face, said edge, and toward at least a portion of said recessed surfaces thereby forming an alloy oxide of said alloy substrate at least on said face and said edge disposed between said face and said recessed surfaces;

applying a second polymeric coating over said face, said recessed surfaces and said edge disposed between said face and said recessed surfaces, thereby adhering said second polymeric coating over said alloy oxide.

2. The method set forth in claim 1, wherein said step of projecting the plasma jet toward said wheel is further defined by rotating said wheel relative to said jet element around a wheel axis while articulating said nozzle element radially inwardly and radially outwardly of said wheel.

3. The method set forth in claim 1, wherein said step of projecting the plasma jet is further defined by infusing said plasma jet with a reactant thereby increasing the reactivity of said face, said recessed surfaces and said edge disposed between said face and said recessed surfaces.

4. The method set forth in claim 1, wherein said step of infusing said plasma jet with a reactant is further defined by infusing said plasma jet with siloxane.

5. The method set forth in claim 1, wherein said step of providing a nozzle element if further defined by providing a plurality of nozzles each cooperably projecting a plasma jet toward said wheel.

6. The method set forth in claim 1, wherein said step of providing a nozzle element is further defined by mounting a nozzle on an articulating arm for maintaining said nozzle at a constant distance from said face, said recessed surfaces and said edge disposed between said face and said recessed surfaces.

7. The method set forth in claim 1, further including the step of projecting a plasma jet over said first second polymeric coating and applying a second layer of polymeric coating thereupon.

8. The method set forth in claim 1, wherein said step of machining said face of said wheel thereby providing a smooth surface at said face of said wheel is performed after said step of applying a first second polymeric coating.

* * * * *